United States Patent [19]

Vagaggini

[11] Patent Number: 5,178,247
[45] Date of Patent: Jan. 12, 1993

[54] RACEWAY FOR SUPPORTING AND GUIDING A POWER CHAIN

[75] Inventor: Marco Vagaggini, Varese, Italy
[73] Assignee: Luwa Bahnson, Inc., Charlotte, N.C.
[21] Appl. No.: 696,369
[22] Filed: May 6, 1991
[30] Foreign Application Priority Data May 11, 1990 [IT] Italy .................... 20268 A/90

[51] Int. Cl.$^5$ .................................. H02G 11/00
[52] U.S. Cl. ................... 191/12 C; 191/23 R
[58] Field of Search ........... 191/1 R, 12 R, 12 C, 191/23 R, 23 A, 24, 28

[56] References Cited

U.S. PATENT DOCUMENTS

| | | | |
|---|---|---|---|
| 3,284,036 | 11/1966 | Nansel | 191/12 C |
| 3,433,889 | 3/1989 | Vries, Jr. | 191/12 R X |
| 3,630,325 | 12/1971 | Corl et al. | 191/12 C |
| 3,716,986 | 2/1973 | Cork et al. | 191/12 C X |
| 3,833,774 | 9/1974 | Mills | 191/12 R |
| 4,121,318 | 10/1978 | Jacobi . | |
| 4,384,594 | 5/1983 | Moritz | 191/12 C X |
| 4,462,565 | 7/1984 | Johnson | 191/12 C X |

FOREIGN PATENT DOCUMENTS

| | | |
|---|---|---|
| 0021153 | 1/1981 | European Pat. Off. . |
| 214263 | 10/1984 | Fed. Rep. of Germany .... 191/12 C |
| 3503755 | 8/1986 | Fed. Rep. of Germany . |
| 262949 | 12/1988 | Fed. Rep. of Germany .... 191/12 C |
| 278450 | 5/1990 | Fed. Rep. of Germany .... 191/12 C |
| 1049613 | 10/1975 | Italy . |
| 664583 | 1/1986 | Switzerland . |

Primary Examiner—Michael S. Huppert
Assistant Examiner—Scott L. Lowe
Attorney, Agent, or Firm—W. Thad Adams, III

[57] ABSTRACT

A raceway for a power chain for a carriage adapted to traverse an apparatus on a preset path. The power chain carries conduits for supplying power or control fluids to the carriage. The raceway allows movement of the power chain along the length of the apparatus but prevents lateral and upward displacement of the chain out of the raceway.

6 Claims, 3 Drawing Sheets

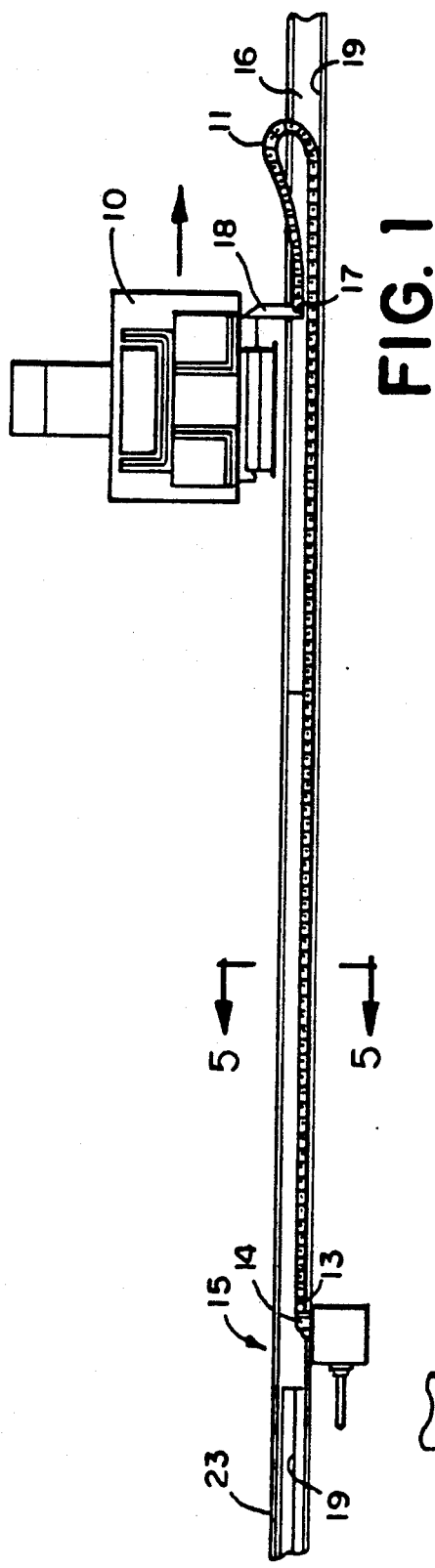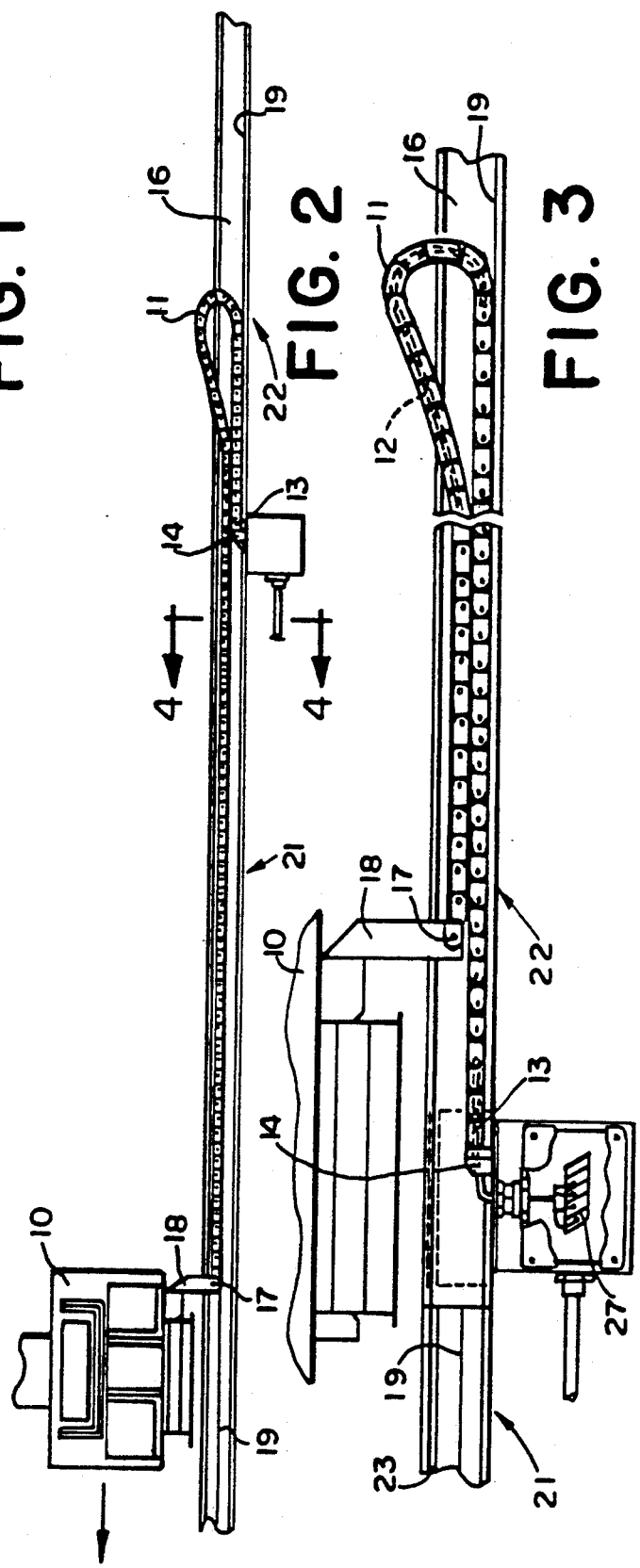

RACEWAY FOR SUPPORTING AND GUIDING A POWER CHAIN

FIELD OF THE INVENTION

The present invention relates to power chains of the type used to house conduits for supplying control fluids or power to a movable carriage from a fixed source, and has particular application to a raceway for supporting the chain in textile apparatus having a carriage adapted to traverse the apparatus to pneumatically clean lint and other foreign material from the operating parts of the apparatus.

BACKGROUND OF THE INVENTION

Pneumatic cleaners for textile apparatus typically have a movable carriage which is adapted to traverse the length of the textile machinery. The carriage has compressed air outlets and vacuum nozzles to clean the parts of the textile apparatus which are likely to become fouled with lint and other foreign matter. The compressed air and vacuum are supplied from a fan blower on the carriage, which is powered and controlled through conduits housed in a power chain having one end connected to a source positioned centrally along the length of the apparatus and the other end connected to the carriage. The power chain comprises hollow links which are interconnected for unidirectional pivotal movement so that it may be extended in a generally flat condition away from the power source and is free to bend back upon itself for connection to the carriage. Chains of this type are well known and are described, for example, in European Patent No. 0021153. The chain is supported in the textile apparatus on both sides of the supply source along the entire length of the apparatus. On one side of the supply source, the double-chain side, the chain is extended and bent back on itself such that one section of the chain is resting on another section of chain. The movable end of the chain is drawn over the upper surface of the lower section of the chain as the carriage moves between the supply source and the double-chain end of the apparatus.

On the other side of the supply source, the single-chain side, the movable end of the chain is drawn over the bottom surface of the support structure as the carriage moves between the supply source and the single-chain end of the apparatus. In this manner, the carriage can reciprocate along a path approximately twice as long as the chain.

The invention is particularly applicable to pneumatic cleaners of the type described in the following patents: German Patent No. 3,503,755; Swiss Patent No. 664,583; U.S. Pat. No. 4,121,318; and Italian Patent No. and 1,049,613. Reference may be had to these patents for the details of the pneumatic cleaning device to which the present invention is particularly applicable.

Generally, the prior art power chains were supported in the superstructure by shallow troughs extending along the length of the path of movement of the carriage. If the chains are 50 meters in length, they provide a path of approximately 100 meters. In practice, it has been found that after a period of time, wear in the chain causes the chain to slip out of the trough and fall into the underlying apparatus, requiring a shutdown and repositioning of the chain.

SUMMARY OF THE INVENTION

With the foregoing in mind, the present invention provides an improved raceway for a power chain which affords prolonged reliable operation of the device without the disadvantage of malfunctions due to the chain slipping out of its guide way. The present invention provides an improved raceway for the chain which is relatively maintenance free and yet is inexpensive to install.

More specifically, the present invention provides a raceway for supporting the chain, and for retaining the chain within the raceway by preventing lateral and upward movement out of the raceway. The invention must also afford uninhibited passage of the conduit connection from the movable end of the chain to the carriage as the carriage traverses the length of the raceway. The design of the raceway provides improved guidance for the chain as the carriage travels from one end of its path of movement to the opposite end.

In a preferred embodiment of the invention, the raceway is provided with upstanding sidewalls along the length of the path of movement. The sidewalls terminate with inwardly-directed flanges defining a slot through which the conduit connection may pass but which stops upward displacement of the chain from the raceway.

BRIEF DESCRIPTION OF THE DRAWINGS

All of the objects of the invention will be more fully set forth hereinafter with reference to the accompanying drawings, wherein:

FIG. 1 is a side view of a movable carriage near the double-chain end of its path of movement and showing the power chain extending from the carriage to a central supply;

FIG. 2 is a view similar to FIG. 1 showing the carriage near the single-chain end of its path of movement;

FIG. 3 is an enlarged view showing the details of the connection of the carriage to the movable end of the chain and the connection of the fixed end of the chain to the supply means;

DESCRIPTION OF THE PREFERRED EMBODIMENTS

Figure 4:
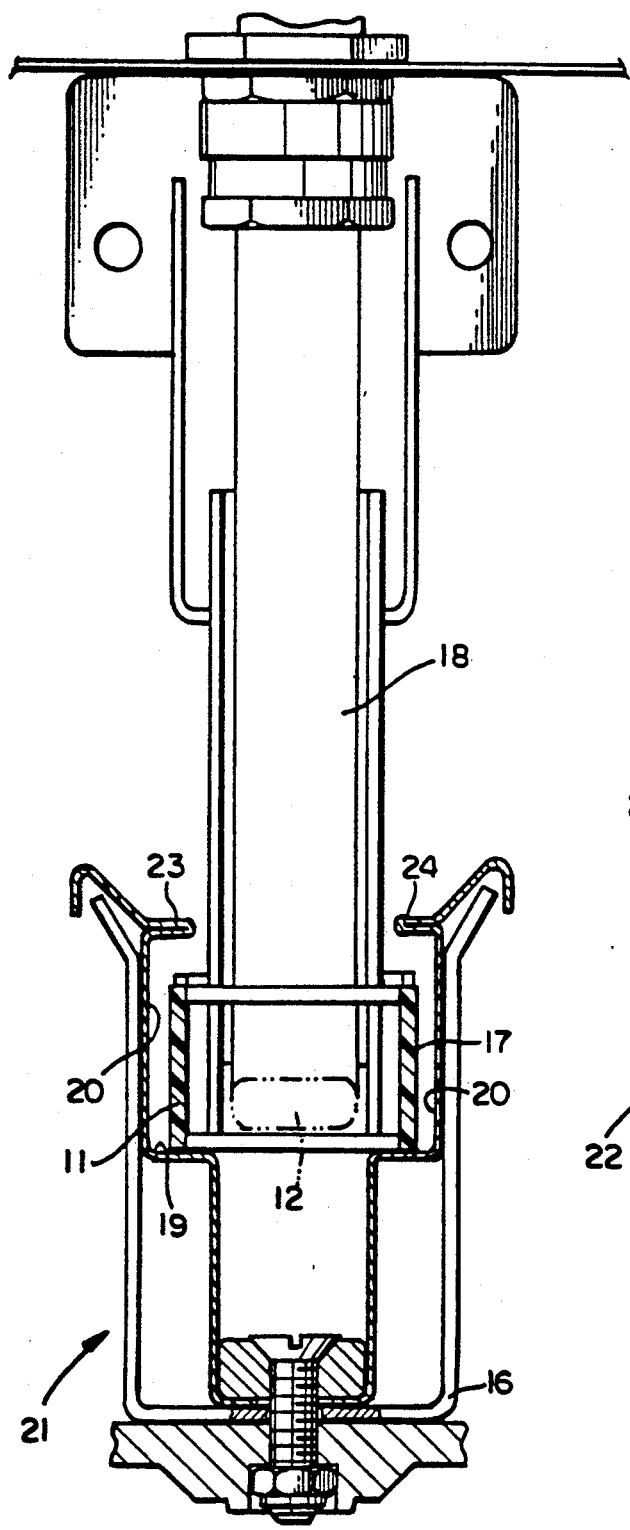
FIG. 4 is a transverse sectional view taken along line 4—4 of FIG. 2.

Referring now in greater detail to the drawings, the present invention provides an elongated raceway for the power chain of a carriage adapted to traverse a textile apparatus along a preset path. The present invention is particularly adapted to a pneumatic cleaning device for a textile apparatus.

Referring to FIG. 1, a carriage 10 is provided for travel along a textile apparatus to perform a desired function, such as cleaning, along the length of the apparatus. The carriage 10 travels along a rail which extends the length of the textile apparatus and the path of travel of the carriage. In one embodiment of the invention, the carriage 10 is a cleaning device for use in a textile machine. The carriage 10 is self-propelled and has vacuum and pressure trunks to direct exhaust and suction air to portions of the textile machine and floor requiring cleaning.

A supply source 27 is provided at a central position 15 of a raceway 16 for supplying the carriage 10 with power to traverse the textile machine, and to energize a blower to provide suction and exhaust air to clean the textile machine. The carriage 10 and the supply source 27 are connected by a power chain 11 which travels in the raceway 16 extending parallel to the rail along the length of the textile apparatus and along the path of travel of the carriage. The power chain 11 has a fixed end 13 connected to the supply source 27 at a connecting point 14, and a movable end 17 connected to the carriage 10 through a connector 18.

One or more conduits are shown diagrammatically at 12, and are disposed in the chain 11 along its entire length. The chain 11 may be, for example, a common commercially-available duct-holder chain which can bend only in one direction. The chain has a uniform height along its length. The conduits comprise power lines, control wires or other conduits, for example tubes or hoses supplying control fluids such as compressed air, and are carried through the chain 11 from the supply source 27 to the carriage 10.

Figure 5:
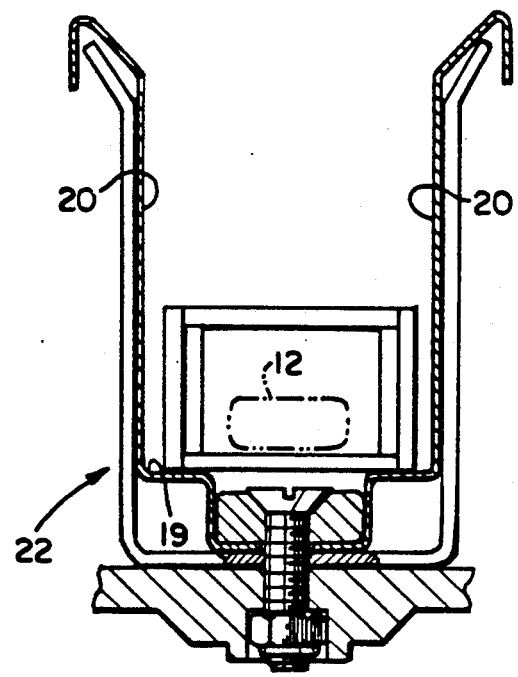
FIG. 5 is a transverse sectional view taken along line 5—5 of FIG. 1.

The raceway 16 for guiding and supporting the power chain 11 has a bottom 19 and two lateral sidewalls 20 as seen in FIGS. 4 and 5. The bottom 19 of the raceway 16 supports the weight of the chain 11. The sidewalls limit lateral movement of the chain 11 while traveling along the preset path of travel of the carriage 10. The chain 11 extends from the supply source 27 towards one end, i.e. a double-chain end 22 of the apparatus and doubles back upon itself within the raceway 16 toward the opposite end, i.e. a single-chain end 21 of the apparatus as seen in FIG. 1. The different ends of the raceway, single 21 and double 22 chain ends, have different profiles to accommodate more effectively the different configurations of the chain.

Referring to FIG. 4, in the preferred embodiment the single-chain end 21 of the raceway comprises an elevated bottom 19, lateral sidewalls 20, and inwardly directed flanges 23 and 24 fixed to the top of the sidewalls 20. The flanges 23 and 24 are spaced apart to define an opening parallel to the sidewalls 20 of the raceway 16. In this embodiment, the opening is a slot running continuously along the length of the raceway 16. The width of the slot accommodates the width of the conduit connector 18 which travels in the slot and is connected to the free end of the power chain 11. The width of the slot must be greater than the width of the connector 18 to allow free movement of the connector 18 along the length of the raceway. However, the width of the slot is less than the width of the chain to prevent upward displacement of the chain through the slot.

In the single-chain end 21 of the raceway 16, the depth of the raceway between the sidewalls 20 must be greater than the uniform height of the chain itself, but at the double-chain end 22, the depth should be twice the height of the chain. Preferably, the top edges of the sidewall 20 at the opposite ends 21 and 22 are at a common height below the carriage 10. To change the depth of the raceway, the bottom 19 of the raceway at one side of the center of the raceway must be elevated or lowered in relation to the carriage. To accommodate the single chain, the bottom 19 of the raceway 16 at the single-chain end 21 is raised relative to the carriage.

At the double-chain end 22, the height of the sidewalls 20 may be the same as the single-chain end. In the illustrated embodiment of the invention, the width of the opening defined between the tops of the sidewalls is the same as the single-chain end but there are no inwardly directed flanges at the top of the sidewalls 20 as seen in FIG. 5. Thus, the chain may pass upwardly out of the top edges of the sidewalls, as shown at the righthand end of FIG. 3. The narrow slot defined on the single-chain end by the flanges 23 and 24 does not extend to the double-chain end. The bottom 19 of the raceway is lowered, however, relative to the carriage 10 to accommodate the doubled chain.

By adjusting the bottom of the raceway to accommodate the single and double chain ends, the surface on which the moving end of the chain travels and slides is at a uniform height with respect to the carriage. As seen in FIG. 3, top surface of the lower segment of the double chain 11 is approximately the same height relative to the carriage 10 as the bottom surface 19 of the raceway at the single-chain end 21. This insures smooth transition from one end of the raceway to the other and improved reliability especially when using a very long chain.

In this embodiment, the aforementioned objects of the invention are fulfilled by providing reliable operation of the chain without slipping out of the raceway. Since no inwardly-directed flanges 23 and 24 are provided on the double-chain end 22 of the raceway, inspections and maintenance inside this portion of the raceway are extremely accessible.

Figure 6:
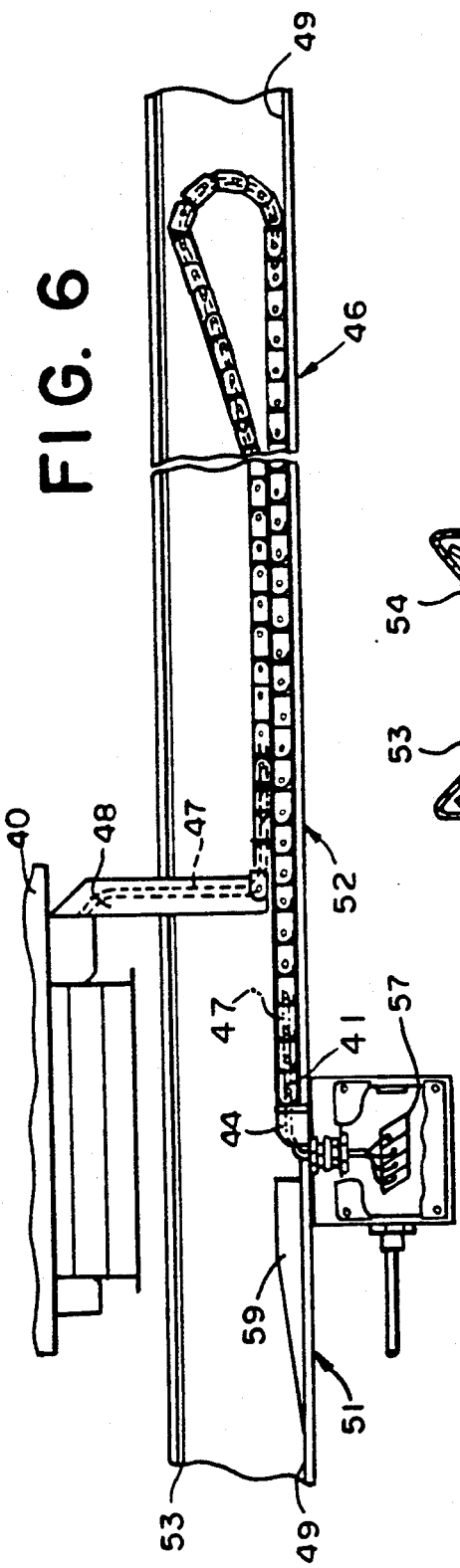
FIG. 6 is a view similar to FIG. 3 showing an alternate embodiment of the invention.
Figure 7:
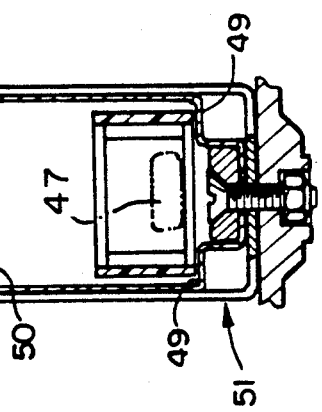
FIG. 7 is a view similar to FIG. 5 showing a sectional view through the alternate embodiment.

In an alternative embodiment of the present invention as illustrated in FIGS. 6 and 7, inwardly-directed flanges 53 and 54 are fixed to the top edges of the sidewalls 50 on the double-chain end 52 of the raceway 46 as well as the single-chain end. The flanges 53 and 54 serve the same function as the flanges on the single-chain end 21 of the previous embodiment. The slot defined by the flanges 53 and 54 runs the entire length of the raceway 46, and accommodates the connector 48 which is carried by the carriage 40 as it traverses the raceway. As in the previously described embodiment, conduits 47 pass from the carriage 40 through the connector 48 and the chain 41 and a connection 44 to a supply 57 at the center of the raceway 46. The height of the sidewalls must be greater than twice the radius of curvature of the chain. In this way, the chain is confined between the sidewalls which therefore limit lateral movement of the chain as the carriage traverses over the raceway.

In this embodiment, the bottom 49 of the raceway is at a common height relative to the carriage 40 along both the single-chain end 51 and the double-chain end 52 of the raceway. To insure smooth transition of the chain end between the respective ends, an elevating ramp 59 is provided at the boundary between the two ends 51 and 52. The ramp merges with the bottom 49 towards the single-chain end 51 and has an elevation corresponding to the uniform height of the single chain at the end facing the center of the raceway 46, thereby enabling the end of the chain adjacent the connector 48 to travel smoothly between the bottom 49 at the single-chain end and the top of the lower run of the doubled chain 41. The entire raceway bottom 49 is at substantially the same level throughout.

While particular embodiments of the present invention have been herein illustrated and described, it is not intended to limit the invention to such disclosures, but changes and modifications may be made therein and thereto within the scope of the following claims.

I claim:

1. An elongated chain raceway for an apparatus having a carriage movable lengthwise above said raceway along a preset path of travel, conduit means for supplying said carriage during said lengthwise movement, said conduit having a fixed end connected to supply means positioned below said raceway centrally of the path of travel of the carriage and a movable end having an upwardly-projecting connection to said carriage, and a flexible chain to hold said conduit means, said chain extending from the supply means toward one end of the raceway and doubling back over itself toward the opposite end of the raceway to said conduit's connection with the carriage, whereby when said carriage is positioned between said supply means and said one end of the raceway the chain is doubled back over itself beyond said carriage, and when said carriage is positioned between said supply means and said opposite end of the raceway the chain is single between said carriage and said supply means and is doubled back between the supply means and said one end of the raceway, said raceway extending along the length of the path and having a bottom supporting the weight of the chain and upstanding sidewalls limiting lateral movement of said chain; said sidewalls being of a height at said one end to limit lateral movement of said doubled back chain, and at said opposite end to limit lateral movement of said single chain, and the raceway between the supply means and said opposite end of the path having an opening between the tops of said sidewalls affording longitudinal displacement within said opening of said conduit connection as said carriage moves from said supply means toward said opposite end, said opening being dimensioned to stop upward displacement of the chain out of the raceway between said sidewalls;

wherein said chain has a uniform height throughout its length, said sidewalls having top edges disposed at a common height relative to said carriage, said raceway bottom being positioned below said common height by a distance greater than said uniform chain height at said opposite end of the raceway and by a distance greater than twice said uniform chain height at said one end of the raceway; and further wherein said raceway bottom at said opposite end of the raceway is also below said common height by a distance greater than twice said uniform chain height and forms a ramp to a distance corresponding to said uniform height above the bottom in said opposite end of the raceway adjacent said supply means.

2. A raceway according to claim 1 wherein said opening comprises a slot parallel to said sidewalls, said slot being wider than said connection and narrower than said chain.

3. A raceway according to claim 2 wherein said slot is defined by an inwardly directed flange at the top of at least one of said sidewalls, said flange operable to stop upward displacement of said chain through said opening.

4. A raceway according to claim 2 wherein said slot is defined by a pair of inwardly directed flanges at the tops of said sidewalls, said flanges operable to stop upward displacement of said chain through said opening.

5. A raceway according to claim 1 wherein said chain doubles back on itself with a given radius of curvature, the height of said sidewalls above the bottom in said one end of the raceway being at least twice said given radius, said one end of the raceway having a slot passing said connection and stopping said chain from upward displacement from between said sidewalls.

6. An elongated chain raceway for an apparatus having a carriage movable lengthwise along a preset path of travel, conduit means for supplying said carriage during said lengthwise movement, said conduit having a fixed end connected to supply means positioned centrally of the path of travel of the carriage and a movable end having connection to said carriage, and a flexible chain to hold said conduit means, said chain extending from the supply means toward one end of the raceway and doubling back upon itself toward the opposite end of the raceway to said conduit's connection with the carriage, whereby when said carriage is positioned between said supply means and said one end of the raceway the chain is doubled back over itself beyond said carriage, and when said carriage is positioned between said supply means and said opposite end of the raceway the chain is single between said carriage and said supply means and is doubled back between the supply means and said one end of the apparatus, said raceway extending along the length of the path and having a bottom at a common level throughout its length supporting the weight of the chain and upstanding sidewalls limiting lateral movement of said chain, said sidewalls being of a height above said common level at said one end to limit lateral movement of said double chain, and at said opposite end to limit lateral movement of said single chain, and the bottom of the raceway at said opposite end adjacent said supply means having a ramp facilitating the passage of said chain between the bottom of the raceway at said opposite end to a position on top of the chain at the one end of the raceway as said carriage moves over said supply means.

* * * * *